United States Patent
Rulison et al.

(10) Patent No.: US 6,735,501 B1
(45) Date of Patent: May 11, 2004

(54) SATELLITE COMMANDING USING REMOTELY CONTROLLED MODULATION OF SATELLITE ON-BOARD TELEMETRY PARAMETERS

(75) Inventors: Aaron J. Rulison, Mountain View, CA (US); Richard W. Schiek, Cupertino, CA (US); Wael Kamel, Mountain View, CA (US)

(73) Assignee: Space Systems/Loral, Inc, Palo Alto, CA (US)

( * ) Notice: Subject to any disclaimer, the term of this patent is extended or adjusted under 35 U.S.C. 154(b) by 0 days.

(21) Appl. No.: 09/538,891

(22) Filed: Mar. 30, 2000

(51) Int. Cl.[7] .............................. B64C 1/00; G05D 1/00; G05D 3/00; G01M 17/00; B64G 1/00
(52) U.S. Cl. ............................. 701/13; 701/33; 701/2; 701/29; 701/31; 701/34; 244/158 R; 244/190; 342/358
(58) Field of Search ........................... 701/13, 33, 226, 701/2, 34, 31, 29; 340/825.01, 825.06, 825.16; 244/158 R, 159, 176, 190; 342/358; 714/4, 9, 43, 820, 821, 797, 717, 716, 56; 700/82

(56) References Cited

U.S. PATENT DOCUMENTS

| | | | | |
|---|---|---|---|---|
| 4,539,655 A | * | 9/1985 | Trussell et al. ............. 710/100 |
| 4,787,041 A | * | 11/1988 | Yount ............................. 701/3 |
| 5,271,582 A | * | 12/1993 | Perkins et al. .......... 244/158 R |
| 5,479,347 A | * | 12/1995 | Oguro et al. .................. 701/35 |
| 5,485,383 A | * | 1/1996 | Schreiber ...................... 701/13 |
| 5,485,576 A | * | 1/1996 | Fee et al. ............... 395/185.09 |
| 5,565,856 A | * | 10/1996 | Takaba et al. .......... 340/825.16 |
| 5,583,757 A | * | 12/1996 | Baca, Jr. et al. .............. 700/79 |
| 5,802,077 A | * | 9/1998 | Yeh ............................. 371/36 |
| 5,822,515 A | * | 10/1998 | Baylocq ................ 395/185.09 |
| 5,908,468 A | * | 6/1999 | Hartmann .................... 710/131 |
| 6,058,474 A | * | 5/2000 | Baltz et al. ..................... 713/1 |
| 6,108,300 A | * | 8/2000 | Coile et al. .................. 370/217 |
| 6,122,572 A | * | 9/2000 | Yavnai ......................... 701/23 |
| 6,128,555 A | * | 10/2000 | Hanson et al. ................ 701/13 |
| 6,145,027 A | * | 11/2000 | Seshan et al. ................ 710/22 |
| 6,199,174 B1 | * | 3/2001 | Norizuki et al. ............... 714/4 |

* cited by examiner

Primary Examiner—William A. Cuchlinski, Jr.
Assistant Examiner—Brian J. Broadhead
(74) Attorney, Agent, or Firm—Kenneth W. Float

(57) ABSTRACT

A satellite command system and method that provides satellite commanding using remotely-controlled modulation of telemetry parameters on-board a satellite. Software is provided on each of the redundant processor units that creates separate DMA command input pathways to the redundant processor units. A command translator is used at a ground station to translate a command that is to be implemented on the satellite into a form ready for modulation. The command information is uplinked to the satellite by remotely manipulating (modulating) a quantity that can be measured by the on-board computer using its telemetry collection functions. The software implemented in processor units recognizes the modulation and processes it to reconstruct the command. The reconstructed command is passed to the processor unit, which then executes the command.

3 Claims, 3 Drawing Sheets

SATELLITE COMMANDING USING REMOTELY CONTROLLED MODULATION OF SATELLITE ON-BOARD TELEMETRY PARAMETERS

BACKGROUND

The present invention relates generally to satellite command systems and methods, and more particularly, to a satellite command system and method that provides satellite commanding using remotely-controlled modulation of satellite on-board telemetry parameters.

The assignee of the present invention manufactures and deploys communication satellites that orbit the Earth. Typically, the satellites contains a plurality of central processing units (CPUs). It is possible that a failure may occur while a satellite is in orbit that renders one of the CPU's normal command pathways unusable. In the past, in the event of such a normal command pathway failure, the affected CPU could not be used. There is a need for a solution to this possible problem.

SUMMARY OF THE INVENTION

The present invention provides for a satellite command system and method that provides satellite commanding using remotely-controlled modulation of satellite on-board telemetry parameters. The present invention is useful after a failure of the normal on-board command pathway, wherein command information flows from command receivers to bit detectors, to command decoders, and finally to a computer (CPU). The present invention creates alternate command pathways through novel use of the basic spacecraft control electronics (SCE) architecture already on board the satellite. The present invention does not require any equipment specifically dedicated to this task.

The basic spacecraft control electronics already performs the task of gathering data from equipment distributed over the spacecraft for telemetry. The crux of the present invention is to cause the CPU to interpret certain patterns of variation of telemetry quantities over time as command information. To link ground controllers with the satellite, the particular telemetry item used must be manipulatable from the ground. Equipment that is sensitive to RF waves is most convenient for this purpose.

In an exemplary command system and method, the particular on-board telemetry parameters used happened to be associated with command input equipment but the traditional command input capability of that equipment was not operative. The satellite has a plurality of redundant processor units that are coupled to the command input equipment by way of a respective plurality of buses and command input buses that provide redundant command pathways to each of the redundant processor units. The redundant processor units respectively process the received commands transferred to them by way of the respective bus controllers and buses to control the satellite. The redundant processor units are also coupled to a plurality of distributed data collection units. The distributed data collection units perform command distribution and telemetry data collection.

The system and method of the present invention bypass the presence of a hardware failure that affects the command pathway of the processor units. Software is provided on each of the redundant processor units that creates separate DMA command pathways between each of the redundant processor units and the distributed data collection units.

To use the novel command pathway, a command translator is used at a ground station to translate a command that is to be implemented on the satellite into a form ready for modulation. The translated command is then superimposed on a signal that will be measured as telemetry data on-board the satellite. Thus, the command is generated and modulated on the ground to produce data that is available to the CPU through its telemetry collection functions.

Software implemented in processor units recognizes the modulation, and processes it to reconstruct the command. The processor unit then executes the command. Each of the redundant processor units can thus process the commands received to control the satellite.

The satellite command links, primary or redundant, are replicated without requiring additional, or any, dedicated satellite on-board RF command link receiving hardware. The present invention thus increases satellite command pathway redundancy and thereby improves satellite reliability, without any added costs in mass, power, or on-board hardware.

The present invention was developed, and a specific satellite design change was implemented, in response to an in-orbit failure involving one of an orbiting satellite's two main on-board MIL-STD-1750 central processing units (CPUs). The failure rendered the affected CPU's normal command input programmed input/output (PIO) bus unusable, while that CPU's direct memory access (DMA) input/output capabilities, including its MIL-STD-1553 data bus, were still fully functional.

The in-orbit failure was corrected using the present invention. In particular, using the present invention, virtually all command link capability was restored to the in-orbit failed main central processing unit, including command link pathway redundancy.

BRIEF DESCRIPTION OF THE DRAWINGS

The various features and advantages of the present invention may be more readily understood with reference to the following detailed description taken in conjunction with the accompanying drawings wherein like reference numerals designate like structural elements, and in which.

DETAILED DESCRIPTION

Figure 1:
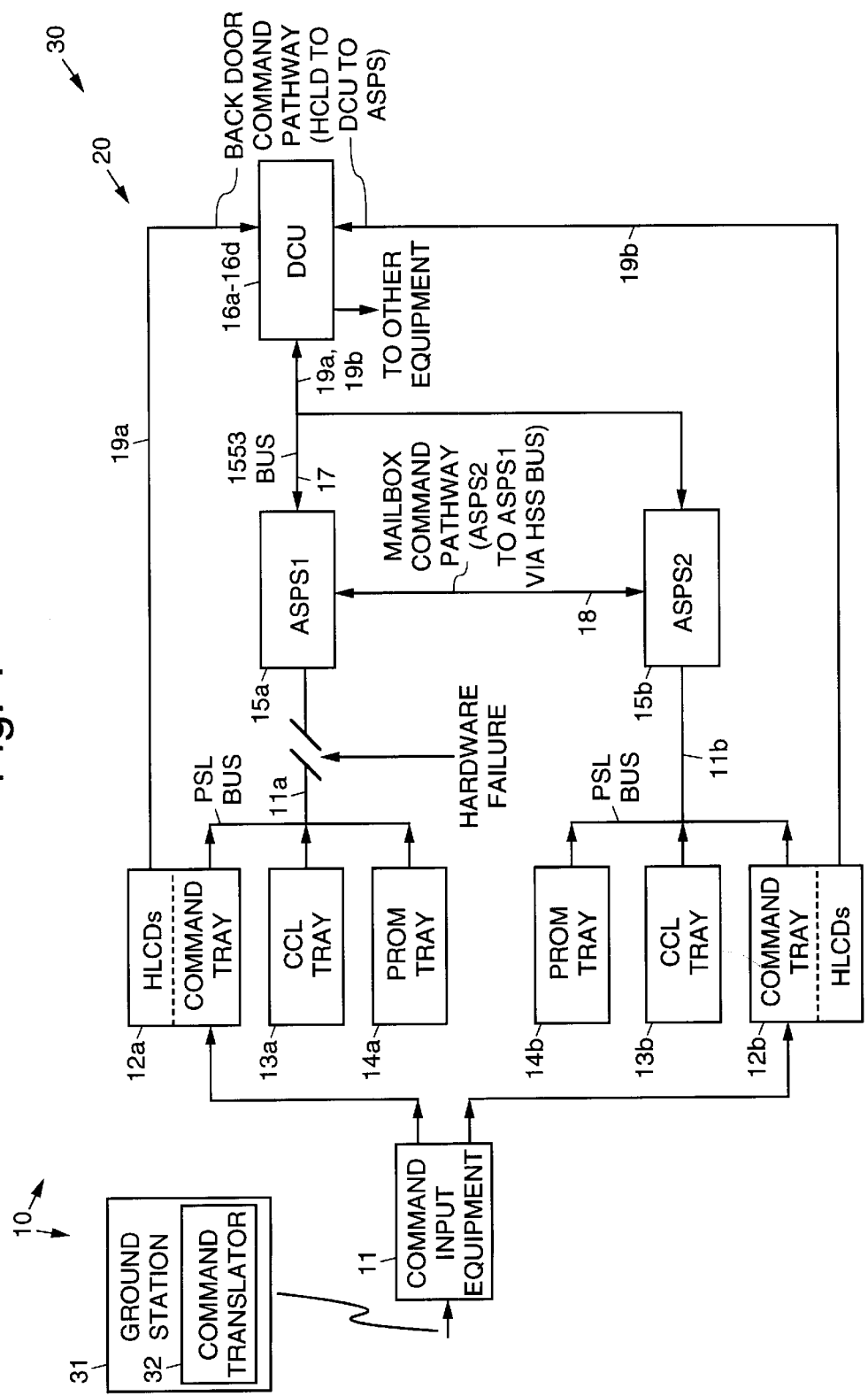
FIG. 1 is a block diagram that illustrates an exemplary satellite command system in accordance with the principles of the present invention.

Referring to the drawing figures, FIG. 1 is a block diagram that illustrates an exemplary command system 10 in accordance with the principles of the present invention for use in commanding a satellite 30. The present invention provides any satellite 30 having a suitable telemetry and command architecture with the ability to implement additional command links (added command pathways) without any of the costs of additional satellite on-board command hardware. The ability to reconfigure the command pathways via uploaded software modifications is particularly valuable.

The present invention has been implemented in an on-orbit satellite 30, whose architecture is shown in FIG. 1, that uses redundant MIL-STD-1750 CPU-based processor units 15a, 15b as its primary on-board processors. The processor units 15a, 15b are referred to as advanced spaceborne processor subassemblies (ASPS). The processor units 15a, 15b utilize a command input bus 11a, shown as a processor stack local (PSL) bus, to communicate with a ground station 31 by way of satellite command input equipment 11 (which includes receivers, demodulators, and bit synchronizers, etc.). The ground station 31 comprises a command translator 32 that is used to convert commands into corresponding sets of modulated bits that are transmitted (uplinked) to the satellite 30 for execution. The processor units 15a, 15b utilize direct memory access (DMA) to communicate with MIL-STD-1553 serial input/output (I/O) bus controllers in distributed data collection units (DCUs) 16a, 16b, 16c, 16d.

Command trays 12a, 12b shown in FIG. 1 each include a bit detector, synchronizer, address decoder, error detector, and high level command decoder (HLCD). The redundant MIL-STD-1750 processor units 15a, 15b also use separate DMA-based serial I/O buses 18 or link 18 to communicate with each other. DC-DC power converters for the processor units 15a, 15b are also typically employed, but are not shown in FIG. 1.

In the satellite 30 illustrated in FIG. 1, telemetry data from virtually all satellite subsystems are sampled by the distributed data collection units (DCUs) 16a, 16b, 16c, 16d and provided to the processor units 15a, 15b by way of a MIL-STD-1553 data bus 17. The MIL-STD-1750 processor units 15a, 15b process and format all satellite telemetry before sending it back to the distributed data collection units 16 for modulation and ultimately for RF transmission to the ground station.

The overall concept implemented by the present invention is as follows. Normally, certain data is measured by DCUs 16a, 16b, 16c, 16d on-board the satellite 30 and subsequently transmitted (downlinked) to the ground station 31 for evaluation. Typical data measured by the DCUs 16a, 16b, 16c, 16d includes HLCD status bits, on/off status, power or current draw, certain RF parameters, and certain temperatures, and the like.

Figure 2:
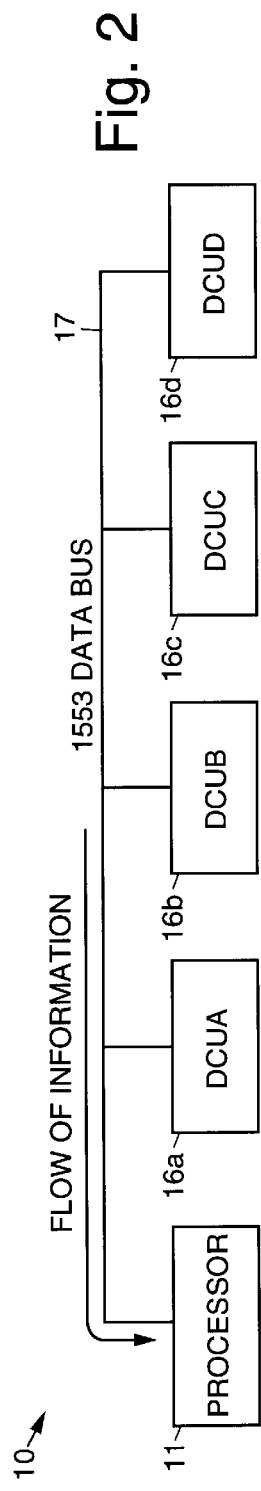
FIG. 2 illustrates data flow using the satellite command system of FIG. 1.

The present invention utilizes telemetry data measurements by the DCUs 16a, 16b, 16c, 16d as a pathway to uplink commands to the satellite 30. Of course, the particular data used in the command pathway must be manipulatable from the ground. The data can come from any DCU 16a, 16b, 16c, 16d as shown in FIG. 2.

In general, data measured by the distributed data collection unit 16 are manipulated by the ground station 31 using the command translator 32 to generate a set of telemetry parameter changes at the satellite 30 corresponding to each desired command. The processor units 15a, 15b on-board the satellite 30 are programmed to form commands from each uplinked set of (sequential) telemetry parameter changes.

In particular, at the ground station 31, a command that is to be implemented on the satellite 30 is first translated by the command translator 32 into a predetermined sequence that is ready for modulation. The translated command information is then uplinked to the satellite 30 by modulating a quantity that can be measured on-board through the telemetry collection process. Software implemented in the processor units 15a, 15b is designed to monitor DMA data pathways 19a, 19b from the high level command decoder (HLCD) in the command trays 12a, 12b by way of the distributed data collection unit 16 to the processor unit 15a. The software processes the modulated telemetry data to reconstruct the original command. The command is then implemented by the processor unit 15a.

Figure 3:
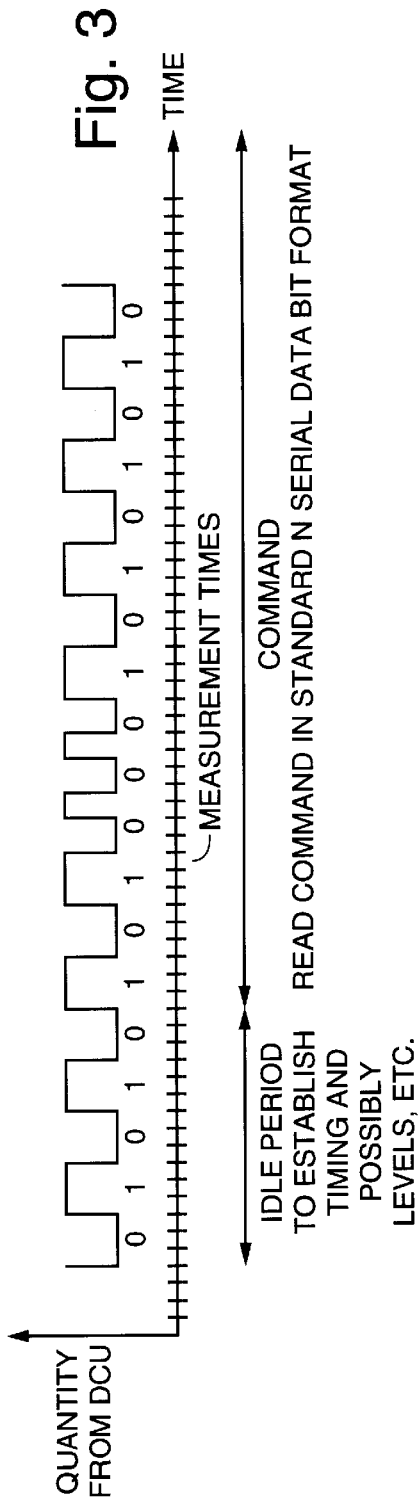
FIG. 3 illustrates timing performed in the satellite command system of FIG. 1.
Figure 4:
FIG. 4 illustrates a typical data structure of command words used in the present invention.

An exemplary algorithm used to generate a command is as follows. The modulated set of bits may be generated using an on-off keying (OOK) RF carrier with a symbol rate less than the rate at which the telemetry data is measured by the DCUs 16a, 16b, 16c, 16d, divided by four. Inverted bi-phase-L signaling is preferably used, such as is shown in FIG. 3.

The A/D input sample is quantized to N bits upon receipt by the receivers in the satellite command input equipment 11. Once the command data is again in a serial binary data stream then command frame synchronization, error detection and decoding are performed completely in software. If all these checks are successful then the command is processed by the normal command processing software, as if the command had been received and detected via the normal command receiving hardware.

In a reduced-to-practice implementation of the present invention, the inherent software access to all satellite telemetry data and the DMA link 18 between the redundant processor units 15a, 15b are both used to provide new redundant command pathways 19a, 19b into the command software of a processor unit 15a. The command pathway failure is illustrated by the break in the PSL bus coupled to the first processing unit 15a. The two separate new DMA command pathways 19a, 19b were implemented and were independent from the normal programmed input/output (PIO) command input bus (PSL bus) of the failed MIL-STD-1750 processor unit 15a.

By adding new input command data sensing software routines into the software operating in the processor units 15a, 15b, sequential data bits comprising command words were detected. This additional command input software looked for certain specific changes and patterns in several specific telemetry values that could be directly controlled by ground station actions. When a complete command word was detected and assembled a telemetry source (i.e., in either or both of the processor units 15a, 15b), it is passed into pre-existing command processing software for execution. Using multiple separate telemetry inputs from redundant external hardware units provided new redundant command pathways for both of the processor units 15a, 15b.

In this first design implemented using the commanding concept of the present invention, two digital and four analog telemetry parameters were selected, which were easily controlled by the satellite's ground command station. The actual digital telemetry parameters used in this implementation included multiple bits each, all of which the ground station could precisely affect and control. The analog telemetry parameters were selected because they could be easily controlled by ground transmitter uplink drive level modulation. However in the basic design concept described herein, any telemetry parameter for which the ground station has positive control may be processed in the telemetry and command systems on-board software to extract command information. Suitable telemetry may include digital or analog values of on-board RF equipment that are subject to change in response to ground station actions. Examples of ground station controllable parameters that affect satellite telemetry parameters include a broad bandwidth repeater channel's uplink drive level or a frequency locked receiver channel's automatic gain control level.

In summary, the present invention provides for the on-board digital signal processing of satellite telemetry parameters to extract satellite command information from telemetry values that are controlled (directly or indirectly) by satellite operators.

The present invention results in a lower or slower command baud rate than a satellite's normal or typical command link's baud rate. However with design implementation care, or with the early satellite design planning for this capability, a very useable command rate and a quite acceptable command error rate can be achieved. It is also possible to utilize the commanding concept of the present invention as the only command link, or links, for a satellite if an absolute minimum satellite hardware telemetry and command equipment configuration is desired.

Any satellite architecture having telemetry collection and command processing accomplished within the same processor unit(s) 15a, 15b can make use of the present invention. If separate command and telemetry data buses are used within the processor unit(s) 15a, 15b, for example, using "normal" commanding via the command input bus 11a and telemetry via direct memory access (DMA), then the satellite's commanding reliability is improved using the present invention. All typical ground system command verification modes may be implemented using the present invention. However, depending on the satellite's specific design, there will be a decrease in the actual ground verified effective commanding rate.

Figure 5:
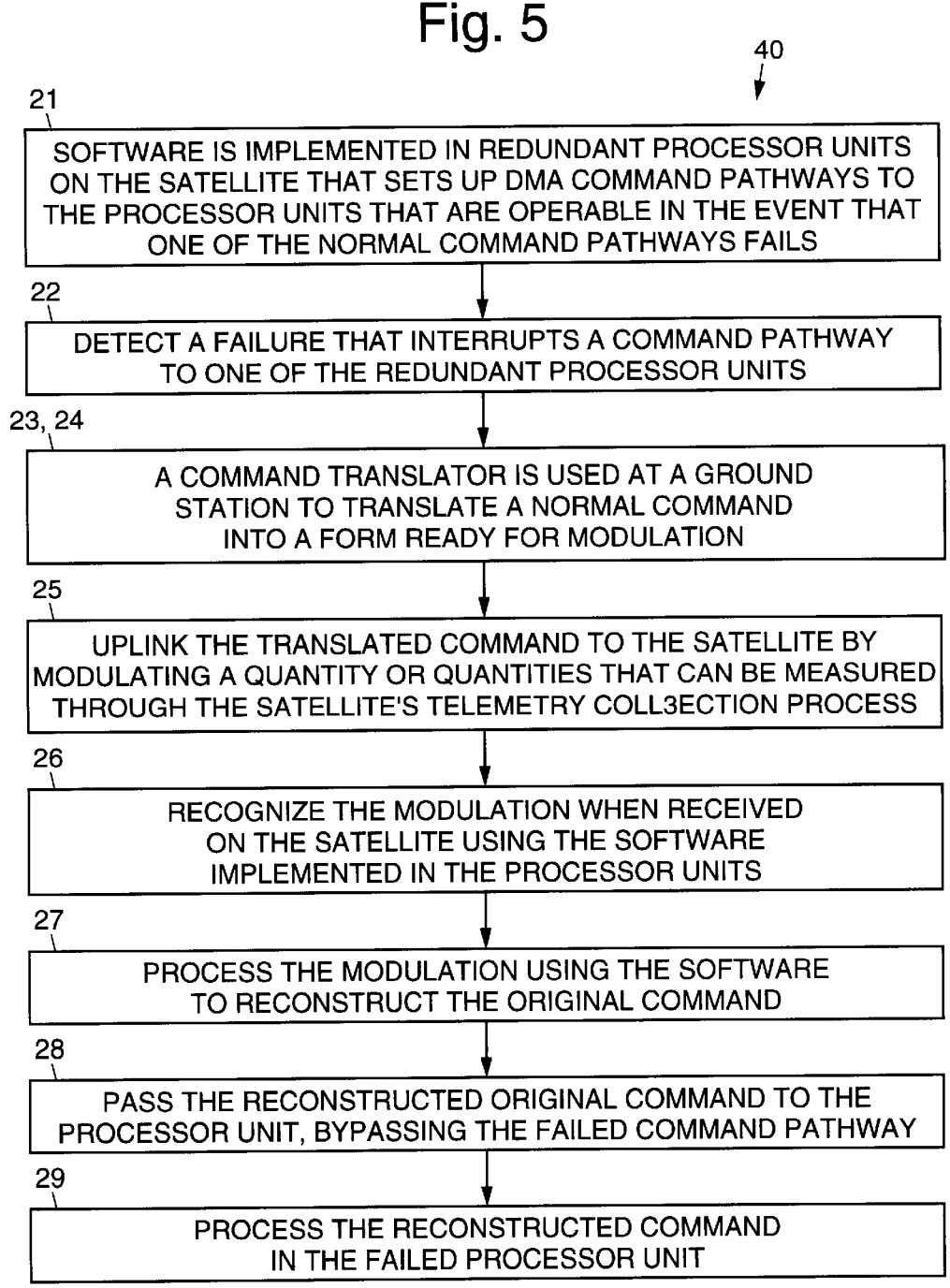
FIG. 5 is a flow diagram that illustrates an exemplary method in accordance with the principles of the present invention.

The present invention was first implemented by uploading changes to software in the satellite's main processor units 15a, 15b, re-establishing prime and redundant command pathways into the failed processor unit 15a. For the purposes of completeness, FIG. 5 is a flow diagram that illustrates an exemplary command method 40 in accordance with the principles of the present invention for use in controlling a satellite 30. The method 40 comprises the following steps.

Software is implemented in processor units 15a, 15b on the satellite 30 that sets up 21 DMA command pathways 19a, 19b to the processor units 15a, 15b that are operable in the event that one or the normal command pathways fails. In the event that a failure is detected 22 that interrupts the command pathway to one of the redundant processor units 15a, 15b, a command translator 32 is used at a ground station 31 to translate 23 a command that is to be implemented on the satellite 30 into a form that is ready for modulation. The translated command is then uplinked 25 to the satellite 30 by modulating a quantity that can be measured on-board through the telemetry collection process.

The software implemented in processor units 15a, 15b recognizes 26 the modulation when received on the satellite 30. The software processes the modulation to reconstruct 27 the original command. The reconstructed original command is passed 28 to the processor unit 15a. The command is then processed 29 by the processor unit 15a.

Thus, a satellite command system and method that provides satellite commanding using remotely-controlled modulation of satellite on-board telemetry parameters have been disclosed. It is to be understood that the described embodiments are merely illustrative of some of the many specific embodiments that represent applications of the principles of the present invention. Clearly, numerous and other arrangements can be readily devised by those skilled in the art without departing from the scope of the invention.

What is claimed is:

1. A satellite command system that provides satellite commanding using remotely-controlled modulation of satellite on-board telemetry parameters, comprising:

a ground station comprising a command translator for translating a command that is to be implemented on the satellite into a form ready for modulation, and apparatus for uplinking the command to the satellite by modulating a quantity or quantities that are measured on board the satellite through its telemetry collection process;

a satellite comprising:

a plurality of processor units;

a distributed data collection unit coupled to the plurality of processor units by way of a data bus that collects modulated telemetry data;

satellite command input equipment respectively coupled to the plurality of processor units; and software disposed on the plurality of processor units that uses a DMA command pathway from the satellite command input equipment to the processing units that is independent from a command input bus, that detects the modulated telemetry data collected by the distributed data collection unit, reconstructs the command, and passes the reconstructed command to command processing software for execution.

2. A satellite command method that provides satellite commanding using remotely-controlled modulation of satellite on-board telemetry parameters, comprising the steps of:

providing software in processor units on a satellite that uses DMA command pathways to the processor units that operate in parallel with normal command pathways;

using a command translator at a ground station to translate a command that is to be implemented on the satellite into a form ready for modulation;

uplinking the translated command to the satellite by modulating a quantity that can be measured by the processor units through telemetry collection functions;

processing the uplinked modulated data bits using the software implemented on board in the processor units to recognize the modulation when received on the satellite;

processing the modulation to reconstruct the command; and executing the reconstructed command.

3. A satellite command system that provides satellite commanding using remotely-controlled modulation of satellite on-board telemetry parameters, comprising:

a ground station comprising a command translator for translating a command that is to be implemented on the satellite into a form ready for modulation, and apparatus for uplinking the command to the satellite by modulating a quantity or quantities that are measured on board the satellite through its telemetry collection process;

a satellite comprising:

a plurality of processor units;

a distributed data collection unit coupled to the plurality of processor units by way of a data bus that collects telemetry data;

satellite command input equipment respectively coupled to the plurality of processor units; and software disposed on the plurality of processor units that uses a DMA command pathway from the satellite command input equipment to the processing units that is independent from a command input bus, that detects the modulated telemetry data collected by the distributed data collection unit, interprets variations in telemetry quantities over time to reconstruct the command, and passes the reconstructed command to command processing software for execution.

* * * * *